(12) United States Patent
Todić et al.

(10) Patent No.: US 10,147,095 B2
(45) Date of Patent: Dec. 4, 2018

(54) CHAIN UNDERSTANDING IN SEARCH

(71) Applicant: MICROSOFT TECHNOLOGY LICENSING, LLC, Redmond, WA (US)

(72) Inventors: Nikola Todić, Belgrade (RS); Fedor Vladimirovich Borisyuk, Redmond, WA (US); Nikola Neborišević, Belgrade (RS); Andrija Jandrlić, Belgrade (RS); Nemanja Marsenić, Belgrade (RS); Siddhika Nevrekar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 592 days.

(21) Appl. No.: 14/701,486

(22) Filed: Apr. 30, 2015

(65) Prior Publication Data
US 2016/0321345 A1 Nov. 3, 2016

(51) Int. Cl.
G06F 17/00 (2006.01)
G06Q 30/00 (2012.01)
G06F 17/30 (2006.01)

(52) U.S. Cl.
CPC ......... *G06Q 30/00* (2013.01); *G06F 17/3053* (2013.01); *G06F 17/30554* (2013.01); *G06F 17/30589* (2013.01); *G06F 17/30598* (2013.01); *G06F 17/30864* (2013.01)

(58) Field of Classification Search
CPC .............. G06Q 30/00; G06F 17/30598; G06F 17/3053; G06F 17/30589; G06F 17/30554; G06F 17/30864
USPC ........................................................ 707/603
See application file for complete search history.

(56) References Cited

U.S. PATENT DOCUMENTS

| 5,953,722 | A | 9/1999 | Lampert et al. |
| 8,015,172 | B1* | 9/2011 | Cave ................... G06F 17/3087 707/706 |
| 8,538,898 | B2 | 9/2013 | Lu et al. |
| 8,572,074 | B2 | 10/2013 | Ahari et al. |
| 8,594,996 | B2 | 11/2013 | Liang et al. |

(Continued)

FOREIGN PATENT DOCUMENTS

WO 2014152936 A2 9/2014

OTHER PUBLICATIONS

Khan, Hina A., et al., "Scalable Diversification of Multiple Search Results", CIKM '13, San Francisco, CA, Oct. 27-Nov. 1, 2013, pp. 775-780.*
Al-Masri, Eyhab, et al., "Crawling Multiple UDDI Business Registries", WWW 2007, Banff, Alberta, Canada, pp. 1255-1256.*
Roth, Mary A., et al., "Information integration: A new generation of information technology", IBM Systems Journal, vol. 41, No. 4, © 2002, pp. 563-577.*

(Continued)

*Primary Examiner* — Robert Stevens
(74) *Attorney, Agent, or Firm* — International IP Law Group, PLLC

(57) ABSTRACT

Methods and systems for generating and storing entity chain information, and for responding to search queries according to the entity chain information is presented. As a service obtains information regarding geographic entities, a plurality of entity records corresponding to each of a plurality of geographic entities is created (or updated) in an entity store. The service then analyzes the plurality of geographic entities (via the entity information in each of the entity records) to identify geographic entities that belong to an entity chain. Information regarding the identified entity chains are then also stored in the entity store.

20 Claims, 6 Drawing Sheets

(56) References Cited

U.S. PATENT DOCUMENTS

| | | | |
|---|---|---|---|
| 8,626,692 B2 | 1/2014 | Bauer | |
| 8,713,434 B2 | 4/2014 | Ford et al. | |
| 9,057,616 B1* | 6/2015 | Lopatenko | G08G 1/0962 |
| 9,602,965 B1* | 3/2017 | Kalis | H04W 4/02 |
| 2007/0233777 A1 | 10/2007 | Bates et al. | |
| 2009/0106681 A1* | 4/2009 | Gupta | G06F 17/3087 715/771 |
| 2009/0234848 A1* | 9/2009 | Leff | G06F 17/30864 |
| 2010/0082590 A1 | 4/2010 | Nye | |
| 2010/0211566 A1* | 8/2010 | Ghanekar | G06F 17/3087 707/724 |
| 2011/0093515 A1* | 4/2011 | Albanese | G06Q 30/02 707/812 |
| 2011/0113064 A1* | 5/2011 | Govindachetty | G06F 17/30241 707/771 |
| 2011/0313968 A1* | 12/2011 | Dumais | G06F 17/30241 706/52 |
| 2012/0084323 A1* | 4/2012 | Epshtein | G06F 17/3087 707/776 |
| 2013/0006914 A1 | 1/2013 | Ray et al. | |
| 2013/0031089 A1 | 1/2013 | Allen et al. | |
| 2013/0110830 A1 | 5/2013 | Vadlamani | |
| 2013/0339340 A1 | 12/2013 | Pfitzner | |
| 2014/0114965 A1 | 4/2014 | Balduzzi et al. | |
| 2014/0358971 A1* | 12/2014 | Aminzade | G06F 17/3064 707/780 |

OTHER PUBLICATIONS

Microsoft Computer Dictionary, 5th Edition, Microsoft Press, Redmond, WA, © 2002, pp. 141, 145 and 211.*

Hassanzadeh, Oktie, et al., "Discovering Linkage Points over Web Data", The 39th International Conf. on Very Large Data Bases, Riva del Garda, Trento, Italy, Aug. 26-30, 2013, Proc. of the VLDB Endowment, vol. 6, No. 6, pp. 445-456.*

Hassanzadeh, Oktie, et al., "Creating probabilistic databases from duplicated data", The VLDB Journal, vol. 18, © 2009, pp. 1141-1166.*

Battistini, Alessandro, et al., "Web data mining for automatic inventory of geohazards at national scale", Applied Geography, vol. 43, Elsevier, © 2013, pp. 147-158.*

Lacoste-Julien, et al., "SIGMa: Simple Greedy Matching for Aligning Large Knowledge Bases", In Proceedings of 19th ACM SIGKDD International Conference on Knowledge Discovery and Data Mining, Aug. 11, 2013, pp. 572-580.

Fafalios, et al., "Post-Analysis of Keyword-based Search Results using Entity Mining, Linked Data and Link Analysis at Query Time", In Proceedings of IEEE International Conference on Semantic Computing, Jun. 16, 2014, pp. 36-43.

Kasneci, et al., "NAGA: Harvesting, Searching and Ranking Knowledge", In Proceedings of ACM SIGMOD International Conference on Management of Data, Jun. 2008, pp. 1-3.

\* cited by examiner

CHAIN UNDERSTANDING IN SEARCH

BACKGROUND

Many stores belong to a chain of stores, whether they are owned by a single entity or whether they are franchised stores. By chain of stores or entity chain, it is meant that two or more geographic entities (such as business entities each having a physical location) that share one or more common features, such as brand, a common customer experience, including at least some overlap in regard to the nature of their commerce. While some business chains are well known, e.g., Walmart®, Costco®, and REI®, a substantial majority of business chains are not well known.

For a search engine, understanding whether a particular local store is part of a chain of stores is a difficult process. Indeed, simply assuming that two entities with a similar name are part of an entity chain can, and often does, lead to erroneous results since two separate geographic entities (typically in different geographic locations) can share the same name and be unrelated.

In spite of the difficulty a search engine might have, when a person is searching for online for local information regarding a geographic entity, e.g., a particular store, and in particular one that is part of a chain of entities, it is important that the search engine recognizes that the entity/store is part of a chain and provides a search results page with a consistent user interface irrespective of which of the chain's individual geographic entities is sought.

SUMMARY

The following Summary is provided to introduce a selection of concepts in a simplified form that are further described below in the Detailed Description. The Summary is not intended to limit the scope of the claimed subject matter.

According to aspects of the disclosed subject matter, methods and systems for generating and storing entity chain information, and for responding to search queries according to the entity chain information is presented. As a service obtains information regarding geographic entities, a plurality of records corresponding to each of a plurality of geographic entities is created (or updated) in an entity store. The service then analyzes the plurality of geographic entities (via the information in each of the records) to identify geographic entities that belong to an entity chain. Information regarding the identified entity chains is then also stored in the entity store.

According to additional aspects of the disclosed subject matter, a computer-implemented method for generating entity chain information is presented. The method comprises first obtaining entity information regarding a plurality of geographic entities. Entity data is identified from the entity information corresponding to each of the plurality of geographic entities, and the identified entity data of each geographic entity of the plurality of geographic entities is stored in an entity record corresponding the geographic entity in an entity data store. One or more groups of geographic entities is generated from the plurality of entity records corresponding to geographic entities represented in the data store. For each of the generated one or more groups of geographic entities, a retaining similarity score is determined for each of the geographic entities in the generated group of geographic entities. The retaining similarity score corresponds to the similarity of a geographic entity to the generated group of geographic entities to which it is grouped. Additionally, for each geographic entity of a group of geographic entities, any geographic entity is removed from the group of geographic entities if the retaining similarity score for the geographic entity falls below a predetermined threshold of similarity for retaining the geographic entity in the predetermined group of geographic entities. Thereafter, an entity chain is established in the entity data store for the generated group of geographic entities comprising to the geographic entities remaining in the generated group of geographic entities.

According to further aspects of the disclosed subject matter, a computer-implemented method of a search engine for responding to a search query for geographic entities from a computer user is presented. The method includes first providing an entity store. The entity store stores information regarding a plurality of entities, and further comprises information regarding a plurality of entity chains, each entity chain comprising at least two geographic entities. A search query is then received from a computer user, the search query identifying a query intent for which relevant search results are requested. A set of search results relevant to the query intent of the search query is determined/identified from a content store of the search engine, where the set of search results is an ordered set of search results according to a first determined relevancy. A determination is made as to whether the query intent of the search query is directed to a geographic entity, and upon determining that the query intent of the search query is directed to a geographic entity, a second determination is made as to whether the geographic entity is part of an entity chain according to information from the entity store. Upon determining that the geographic entity is part of an entity chain, information regarding the entity chain of which the geographic entity is a part is obtained. The set of search results is reordered according to a second relevancy based on the obtained information regarding the entity chain. A search results page is generated according to the set of search results, and the generated search results page is returned in response to the search query.

According to still further aspects of the disclosed subject matter, a computer system hosting a search engine for responding to a search query is presented. The computer system includes a processor and a memory, where the processor executes instructions stored in the memory as part of or in conjunction with additional components to respond to a search query from a computer user. The additional components includes at least a data acquisition component, an entity chain identification component, a search results component, and a search results page generator. In operation, the data acquisition component obtains data regarding a plurality of geographic entities and stores entity records for each of the plurality of geographic entities in an entity store, where each entity record includes data regarding the corresponding geographic entity. The entity chain identification component generates and stores entity chain information in the entity store based on the geographic entities whose records are stored in the entity store. The search results component is configured to obtain search results from a content store and the entity store when the query topic of the search query is directed to a geographic entity. Additionally, the search results page generator generates a search results page according to the search results obtained from the search results component in response to the search engine receiving a search query.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
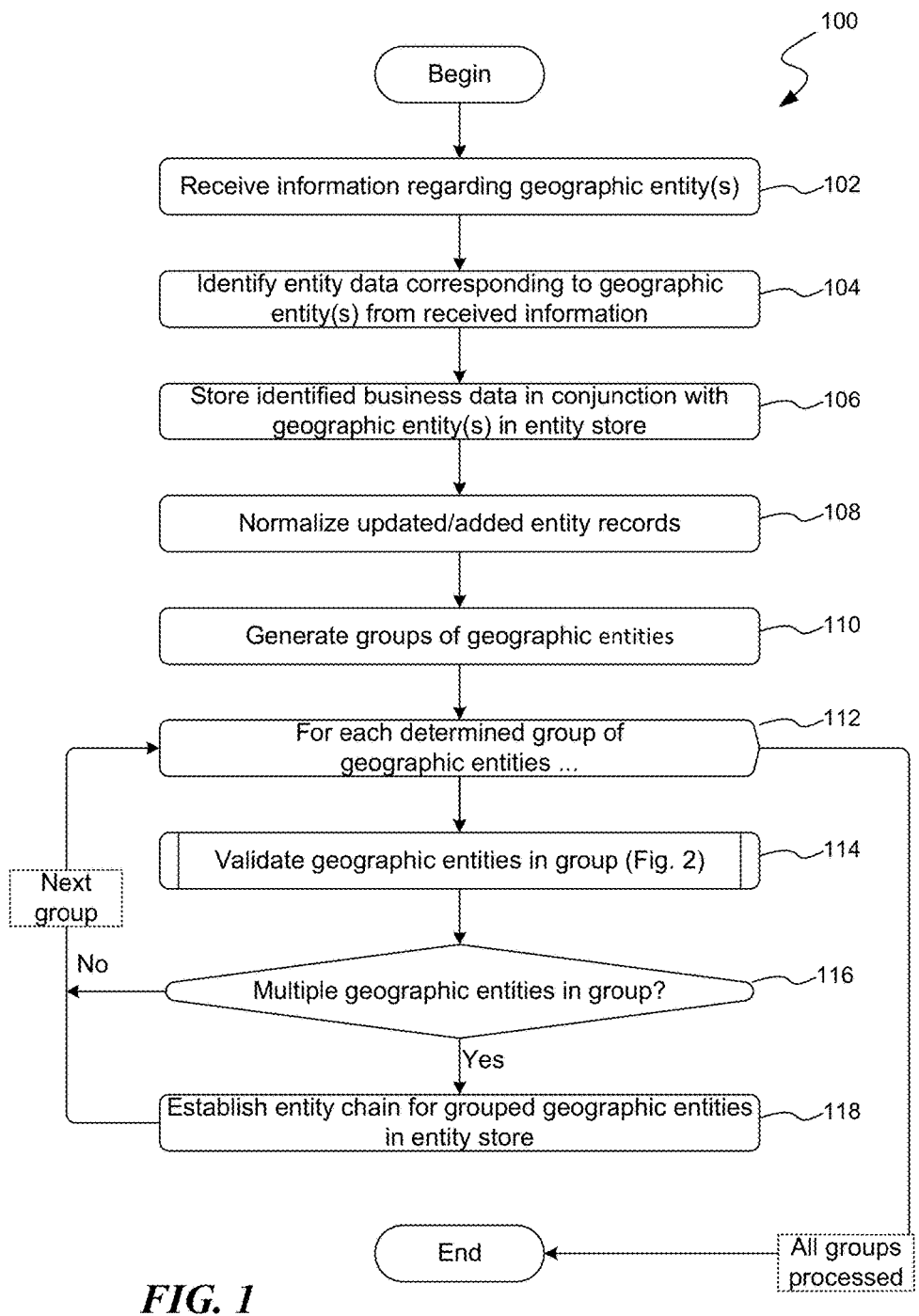
FIG. 1 is a flow diagram illustrating an exemplary routine for generating an entity content store that includes information regarding geographic entities, entity chains and the related geographic entities of the chains.

For purposes of clarity and definition, the term "exemplary," as used in this document, should be interpreted as serving as an illustration or example of something, and it should not be interpreted as an ideal and/or a leading illustration of that thing. Stylistically, when a word or term is followed by "(s)", the meaning should be interpreted as indicating the singular or the plural form of the word or term, depending on the context, and particularly on whether there is one or multiple instances of the word or term. For example, with regard to the term "web site(s)," if there is a single web site in a record, the meaning of "web site(s)" is a web site. Alternatively, if there are multiple web sites in a record, the meaning of "web site(s)" is the multiple web sites. Thus, when referring to a record that may include any number of web sites but the number of web sites is undetermined, the term "web site(s)" is used.

For purposes of this disclosure, the term "chain" or "entity chain" refers to two or more geographic entities (each having a separate physical location) that share one or more common features, i.e., business brand and customer experience, including at least some overlap in regard to the nature of their commerce; common ownership, and the like. The term "entity" or "geographic entity" should be viewed as corresponding to an entity (i.e., a business, a building, a park, etc.) located at a particular geographic location.

By way of definition, the term "local search" corresponds to a search engine conducting an examination of its content stores (including an entity store as will be described below) to identifying relevant results corresponding to a geographic area in response to a search query. These results may include references to businesses (especially including references to businesses in the local/specified geography location) as well as information regarding businesses.

As will be readily appreciated, a search engine largely identifies and/or discovers content on the Internet/web (including content identifying businesses) by a process called crawling: where a process systematically browses Internet sites, captures information from the visited sites, and indexes the captured information in a content index with reference to the visited sites. In this manner, when a person submits a search query to the search engine, the search engine identifies the topic of the search query and, using the content index, quickly identifies related content from the content index, and returns the references to the related content. While crawling the Internet will identify entities, i.e., businesses, locations, buildings, parks, etc., and gather such information as the geographic information of the entity, as well as a reference to the entity's web page or other sources of information, crawling does not lend itself to understanding entity chains or identifying the geographic entities of a given chain.

Of course, in addition to crawling and in an effort to enhance its own content index, a search engine may obtain entity information from a variety of provider sources—online providers of entity information, such a point-of interests sources, business data sources, governmental sources, and the like. However, the entity information, whether obtained via crawling or obtained from online sources, generally identifies available information regarding an entity at a particular location, including web site information, phone information, and the like. Unfortunately, this entity information does not reflect whether or not two or more entities, each with a separate physical location, belong to a chain of entities. Thus, according to at least a first aspect of the disclosed subject matter, a process of chain discovery, i.e., discovering and/or identifying that a given geographic entity is, in fact, part of an entity chain, is presented. The application advantageously identifies relationships among entities that are not readily apparent or easily identified. As will be discussed below in regard to the process of chain discovery, attributes of various entities, such as name, domain of web site, similarity of a business focus among businesses, and the like, are analyzed through various techniques including similarity differences, inverse term frequency, and clustered according to common groupings to identify a common, underlying relationship.

While much of the disclosed subject matter will be made in regard to entities and relationships between entities which can be used to identify entity chains, i.e., two or more entities belonging to the same entity chain, it should be appreciated that this may be readily applied to various classifications on entities. For example, by way of illustration and not limitation, a geographic entity may correspond to various businesses at a distinct geographic locations, and the disclosed subject matter may be used to determine whether two or more business belong to a business chain. For example, an exemplary florist shop, Mary's Flowers, found in west Seattle may, or may not, belong to a business chain and/or franchise. Thus, Mary's Flowers of Seattle may or may not belong to a common business chain with exemplary geographic entity, Mary's Plants and Flowers, in Tacoma. Based on the techniques and processes set forth below, a search engine may establish that, in fact, the two belong (or do not) to the same business entity chain.

In order for a search engine to provide an enhanced user experience with regard to local search for geographic entity, the entity chain information must be identified and made available for access when responding to a search query. FIG. 1 is a flow diagram illustrating an exemplary routine 100 for generating an entity store that includes information regarding geographic entities, entity chains and the related geographic entities of the chains. Beginning at block 102, the exemplary routine 100 receives entity information regarding one or more geographic entities. As discussed above, this entity information may comprise references to an entity's web sites as a result from crawling the Internet (either in the form of discovering a new web site corresponding to a geographic entity or as a revisit to an existing web site to update information regarding the geographic entity). Alternatively and/or additionally, a search engine may obtain entity information from sources other than a crawling process, such as entity information from other online services, including social networking services. For example, a search engine may receive information regarding one or more geographic entities from a social networking service focused on providing reviews of local geographic entity, such as (by way of illustration and not limitation): Yelp®, Angie's List®, Open Table®, the Better Business Bureau®, local and state governments, and the like.

In general, the entity information obtained, either from a crawling process or from other sources will typically include at least some of (by way of illustration and not limitation) for each geographic entity: one or more entity names; one or more web sites associated with the geographic entity; one or more phone numbers and/or fax numbers for the entity; keywords and/descriptions of the type of services offered by a geographic entity; a physical address of the entity; service hours; contact information; and the like. Generally speaking, the entity information for each entity will likely not include information regarding entity chain information, though in well-known chains this information may be available.

At block 104, an analysis of the receiving information is conducted to identify entity data corresponding to the geographic entity. This entity data includes information such as, by way of illustration and not limitation: entity name (or names); location (geographic and/or local address); phone number or numbers; web site; keywords used in reference to the entity's web site; entity categories in regard to geographic entities (e.g., food services, grocery, social services, hardware, medical, etc.); and the like. According to aspects of the disclosed subject matter, the entity category information may be organized according to a hierarchical category taxonomy indicating one or more types of commerce in which the geographic entity is engaged.

At block 106, the entity data is stored in an entity store in conjunction with the geographic entity (or, more particularly, an identifier associated with the geographic entity.) In storing the entity data, the entity data may be stored in the entity store either as an update to existing information associated with the particular geographic entity or as a new record in the entity store. Moreover, for efficiency in processing, entity records (i.e., entries of entity data corresponding to a geographic entity in the entity store) that are updated and/or newly added information are flagged such that the new/updated information can be processed for identifying entities of an entity chain.

At block 108, the entity records that were updated or newly added are normalized in order to be further processed as described below. Normalizing the entity records, or more particularly normalizing the data in the entity records, includes operations such as (by way of illustration and not limitation): removing punctuation from the entity name/names; converting all characters of an entity name/names to the same case; retaining characters of the entity's web site reference (or references) that make up the domain (e.g., truncating the URL from "www.mybiz.com/info.php" to www.mybiz.com.)

At block 110, an analysis is performed on the geographic entities in the entity store, the outcome of which is a grouping of the geographic entities according to a predetermined threshold of commonality between the entity's attributes as defined in the entity data/record of each geographic entity. According to aspects of the disclosed subject matter, the analysis/grouping is conducted according to various elements of the entity data including (by way of illustration and not limitation) any current entity chain information associated with the geographic entities and similarity between: entity name(s); phone number(s); entity categories; entity web sites; descriptive n-grams based on the keywords used in the entity's web site; and the like. An initial grouping of geographic entities may be made in regard to any entity chains already identified in the entity store. Further, in determining groupings of similar geographic entities, individual similarity evaluations may be assigned a score the aggregate scores for all similarity comparisons between entities may be compared to the predetermined threshold to determine the groupings of the geographic entities.

In addition to aggregate similarity scores, other methods for analyzing and grouping the geographic entities in the entity store may be implemented. These include machine learning similarity functions that detect and weight similarities between geographic entities (as determined by the entity data), clustering algorithms, and transitive closure techniques (e.g., if geographic entity B1 in candidate grouping G1 is similar to geographic entity B2 in candidate grouping G2, and geographic entity B2 is similar to geographic entity B3 in candidate grouping G3, then transitive closure techniques suggest that geographic entities B1, B2, and B3 be grouped together in into a single candidate grouping G4.) Thus, a geographic entity not currently grouped into a group of geographic entities and having an aggregated similarity score above a predetermined threshold to another geographic entity that already belongs to a group of geographic entities may be added to that group. Conversely, geographic entities that are not currently grouped into any group of geographic entities and have an aggregated similarity score above a predetermined threshold to one another may form a new group of geographic entities.

At block 112, an iteration is begun for each determined group of the previous step. At decision block 114, a validation of the geographic entities in the currently iterated group is conducted. As will be described below, the result of validating the geographic entities in the currently iterated group is to eliminate those geographic entities in the group that do not have sufficient similarity with the group to be included as a member of a resultant entity chain. Validating the group of geographic entities is described in regard to FIG. 2.

Of course, it should be appreciated that creating an entity chain according to similarities, as described above, will not necessarily result in all entities of an actual chain being included in the created entity chain. Manual curation of entity chains may add and/or remove entities from created entity chains, as well as additional processes in identifying entity chains.

Figure 2:
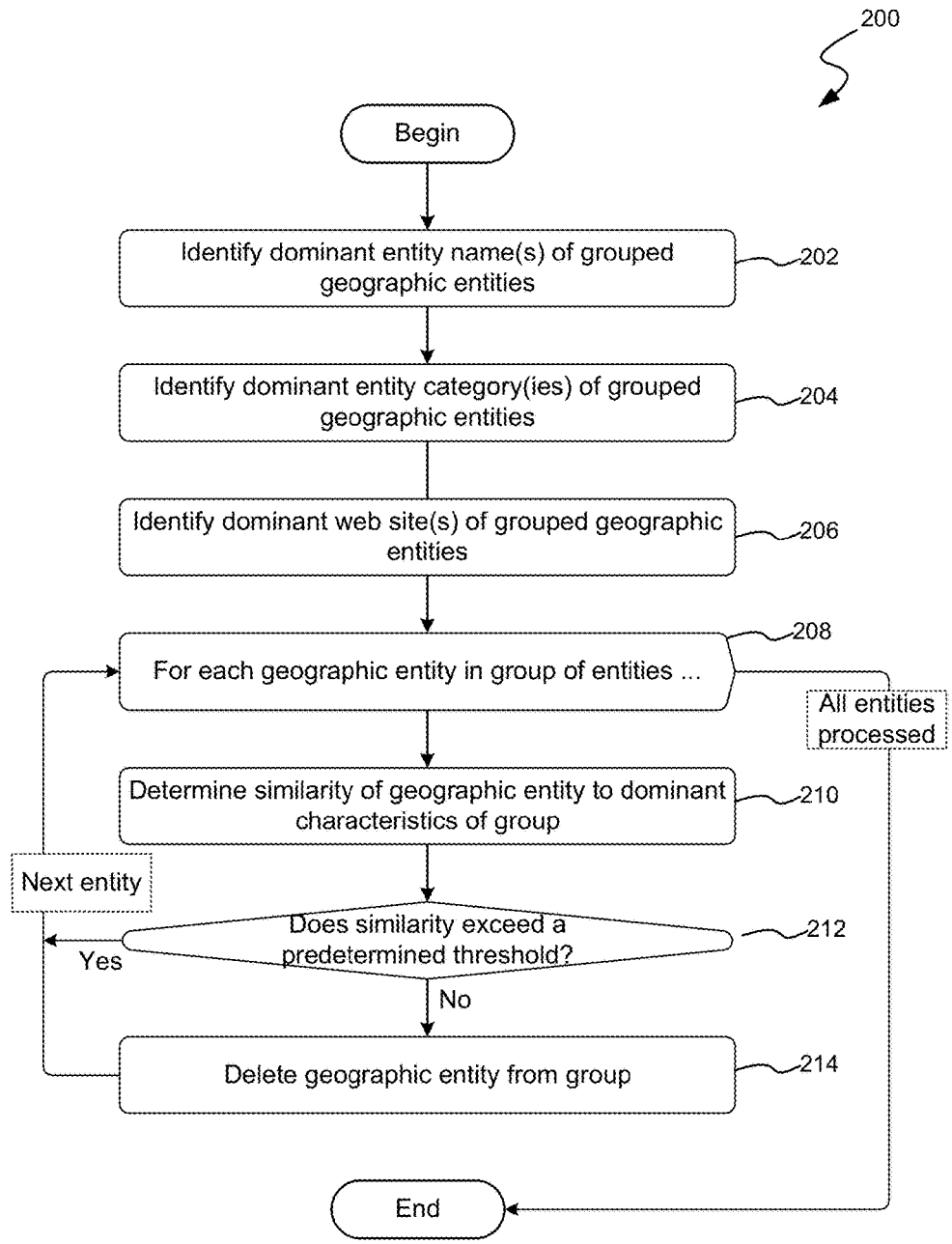
FIG. 2 is a flow diagram of an exemplary routine for validating the geographic entities of a group of geographic entities to determine which of the entities in the group may be included as a member of a resultant entity chain.

Turning then to FIG. 2, this figure is a flow diagram of an exemplary routine 200 for validating the geographic entities of a group of geographic entities to determine which of the entities in the group may be included as a member of a resultant entity chain. Beginning at block 202, the dominant entity names of the currently iterated group are identified. According to the disclosed subject matter, those entity names having a high degree of similarity among a majority of the geographic entities in the group are considered the dominant entity names. At block 204, the dominant entity categories of the currently iterated group are identified. Similar to the dominant entity names, according to the disclosed subject matter, those entity categories that are common among a majority of the geographic entities in the group are considered the dominant entity categories for the group. Further still, at block 206, the dominant web site (or web sites) of the currently iterated group is determined. The web site (or sites) that are common among a majority of the geographic entities in the group are considered the dominant web site(s) for the group.

At block 208, an iteration loop is begun to iterate through each of the geographic entities of the group of geographic entities. As part of the iteration, at block 210, a similarity between the currently iterated geographic entity and the dominant characteristics of the group of entities is determined. This similarity corresponds to an aggregate score/value of one or more comparisons/evaluations, which aggregate score will be compared against a threshold for retaining the geographic entity in the group.

According to aspects of the disclosed subject matter, various similarity measurements can be made with regard to the currently iterated geographic entity against the dominant characteristics of the current group of geographic entities. The measurements include, by way of illustration and not limitation: textual similarity between the dominant entity name (or names) of the group against the entity name (or names) of the currently iterated geographic entity; equality and/or similarity between the dominant website (or websites) of the group against the geographic entity website (or websites); a Levenstein distance or measurement between the currently iterated geographic entity name (or names) and the dominant entity domain (or domains) as derived from the dominant web site (or web sites); similarities between the dominant entity category (or categories) and the geographic entity category (or categories); a similarity between the geographic entity's domain and the dominant entity website (or websites); fuzzy token similarity between the dominant entity name (or names) of the group against and the geographic entity name (or names) including abbreviations, based on similarity token algorithms such as Jaccard, Dice or Cosine similarities algorithms; and the like. Using one or more similarity comparisons (including any of those described above), a machine learning algorithm may also be implemented to determine an aggregated score (the measure of similarity) for the currently iterated geographic entity with regard to the group of entities. In one embodiment, the machine learning uses logistic regression to "learn" how to interpret the results of the various similarity measurements into an aggregate similarity score.

At decision block 212, a determination is made as to whether the aggregate similarity score between the currently iterated geographic entity and the dominant characteristics of the group meets or exceeds a predetermined threshold for retaining the geographic entity in the group. If the similarity meets or exceeds the predetermined threshold for retaining the geographic entity in the group, the routine 200 continues the iteration process by returning to block 208. However, if the similarity does not meet the predetermined threshold for retaining the geographic entity in the group, at block 214 the currently iterated geographic entity is removed from the group. Thereafter, the routine 200 continues the iteration process by returning to block 208.

At block 208, after iterating through all of geographic entities (in processing as described above), routine 200 terminates.

Regarding the similarity scores and the predetermined thresholds described above, it should be appreciated that a similarity score may be viewed as being a probability that a geographic entity belongs to an entity chain and, according to various embodiments, the predetermined threshold may correspond to a function. For example, in determining the similarity of two geographic entities such that they are part of a chain, the values of similarity function(s) are fed as inputs to another function which determines whether they are in the same group.

Returning again to FIG. 1, after validating the geographic entities in the currently iterated group, at decision block 116 a determination is made as to whether the group includes at least two (i.e., multiple) geographic entities. If there are less than two geographic entities in the group, it is assumed that there isn't an entity chain and the routine returns to block 112 for continued iteration of the groups of geographic entities. Alternatively, if there are at least two geographic entities in the currently iterated group, the routine 100 proceeds to block 118 where an entity chain is added (or updated if the entity chain already exists) in the entity store, with its member being the geographic entities remaining in the currently iterated group. The entity chain record in the entity store corresponding to this entity chain includes the dominant entity names, the dominant entity categories, and a list of the geographic entities that remain in the group after validation.

The routine 100 continues in processing all of the entity groups that were generated in block 110. Once all groups have been processed, the routine 100 terminates.

Figure 3:
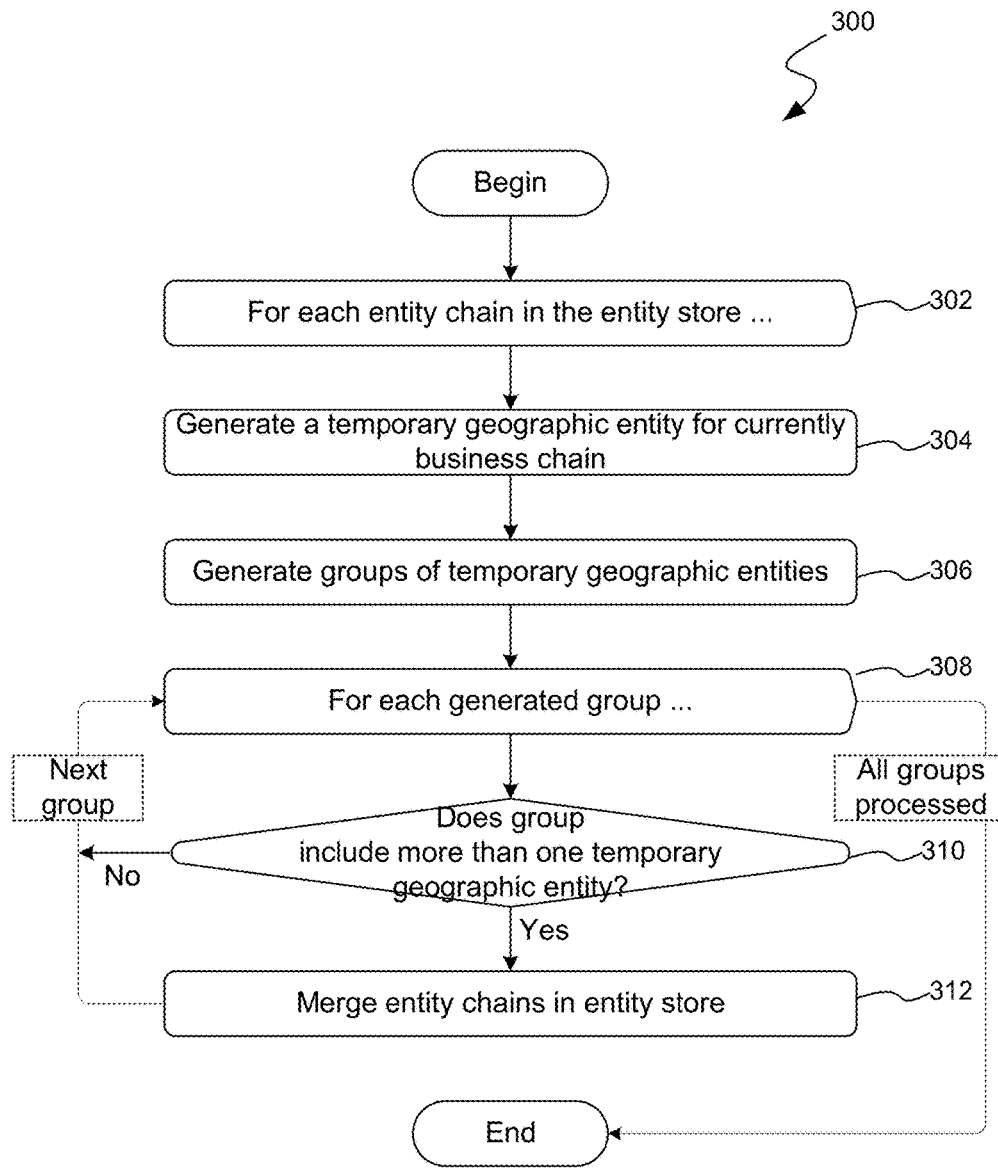
FIG. 3 is a flow diagram illustrating an exemplary routine for processing the entity chains to ensure that duplicate entity chains are coalesced into one entity chain.

After generating (or updating) entity chains in the entity store, the entity chains may be optionally processed to ensure that multiple entity chains (as found in the entity store) that, in fact, represent the same entity chain are coalesced as appropriate. FIG. 3 is a flow diagram illustrating an exemplary routine 300 for processing the entity chains to ensure that duplicate entity chains are coalesced into one entity chain.

Beginning at block 302, an iteration loop is begun to iterate through each of the entity chains in the entity store. At block 304, a temporary geographic entity is generated for the currently iterated entity chain. For example, for entity chain BC1 a temporary geographic entity BE1 is generated, for entity chain BC2 a temporary geographic entity BE2 is generated, and so forth. Each temporary geographic entity is generated to include the geographic entity's name and alternative names, the entity category or categories, and web site or web sites (as determined by each geographic entity in a given entity chain).

At block 306, the chain assignment steps (as described above in regard to steps 110-120 of FIG. 1) are applied to the set of temporary geographic entities, resulting in temporary entity chains. If the chains do not have any overlap, each group will comprise only one temporary geographic entity.

At block 308, an iteration loop is begun through the resulting groups of geographic entities. At block 310, a determination is made as to whether a temporary group includes two or more temporary geographic entities. Of course, if there are two or more temporary geographic entities in the currently iterated group, the entity chains from which the two or more temporary geographic entities were generated are considered to be the same entity chain and are merged together including the geographic entities, the entity names, categories, and web sites. This iteration is repeated until all of the temporary entity chains have been processed, whereupon the routine 300 terminates.

As will be appreciated, the process described above in regard to routines 100, 200 and 300 may be repeated on demand and/or periodically. The condition for repeating the process include, by way of illustration and not limitation, as new geographic entities are identified and added to the entity store, upon detecting changes to geographic entities, or in conjunction with a periodic crawling process of the geographic entity's web site. Also, while not described in regard to the routines 100 300, the geographic entity and entity chain information in the entity store may be indexed according to a variety of keys (e.g., names, web sites, entities, etc.) for efficient and fast access. With this information in an entity store, in response to a local search query, a search engine can easily identify that a geographic entity (relevant to the local search query) is part of an entity chain, which identification might not otherwise be made.

Figure 4:
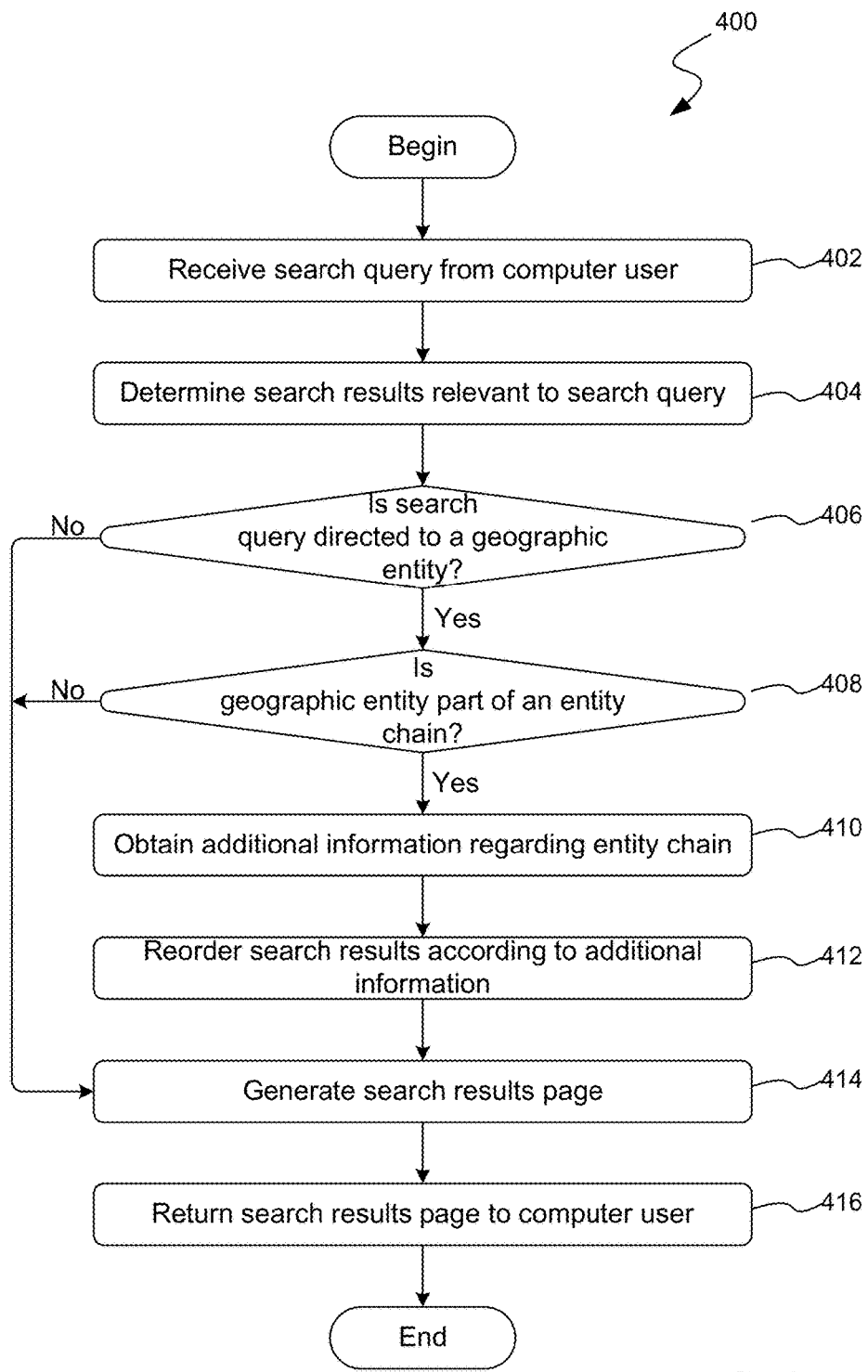
FIG. 4 is a flow diagram illustrating an exemplary routine for responding to a search query in accordance with aspects of the disclosed subject matter.

Using an entity store in place, which includes information regarding geographic entities as well as entity chains, a search engine can provide improved relevancy with regard to the search results it provides as well as an improved user experience with regard to local search. FIG. 4 is a flow diagram illustrating an exemplary routine 400 for responding to a search query in accordance with aspects of the disclosed subject matter. Beginning at block 402, the search engine receives a search query from a computer user. As will be readily appreciated, the computer user, by way of a computing device, submits a search query regarding a specific query topic to the search engine.

At block 404, the search engine determines a set of search results that are considered to be relevant to the subject matter or query topic of the search query (sometimes also referred to as the query intent of the search query.) As discussed above, the search engine typically obtains search results from a content store that it maintains. In addition to obtaining search results from the content store, the search engine may also consult to the entity store (generated as described above) to obtain search results relevant to the search query, especially in regard to a local search query that implicates a geographic entity. As those skilled in the art will appreciate, the search results are associated with a relevance indication, typically a score, indicating the search results relevance to the search query. Generally speaking, these relevance indications are used to order the search results such that those results which are most relevant to the search query (and to the computer user) are presented before those that are less relevant.

At decision block 406, a determination is made as to whether the search query is directed to a geographic entity, such as might be requested in a local search query. If not, the routine 400 proceeds to bloc 414 as described below. However, if the search query is directed to a geographic entity, the routine 400 proceeds to block 408. At decision block 408 another determination is made, this second decision as to whether the geographic entity identified in the search query is part of an entity chain. According to aspects of the disclosed subject matter, the search engine can consult the entity store (generated as described above) and determine whether the geographic entity is part of a chain. If not, the routine proceeds to block 414 for generating the search results page. Alternatively, if the geographic entity is part of an entity chain, the routine 400 proceeds to block 410.

At block 410, the search engine obtains additional information regarding the entity chain to which the geographic entity belongs. This additional information may comprise, by way of illustration and not limitation: descriptions of the entity chain; one or more locations of the entity chain; the entity chain website (or websites); entity chain categories; and the like. At block 412, the search results may be reordered according to the additional information obtained regarding the entity chain.

At block 414, a search results page is generated according to the obtained and sorted search results. To the extent that the search engine implicates a geographic entity that is part of an entity chain, the search results page may be generated to include all or some of the additional obtained set of search results. Thus, at block 416, the generated search results page is returned to the computer user in response to the search query. Thereafter, the routine 400 terminates.

Regarding routines 100, 200, 300 and 400 described above, as well as other processes describe in this document, while these routines/processes are expressed in regard to discrete steps, these steps should be viewed as being logical in nature and may or may not correspond to any actual and/or discrete steps of a particular implementation. Also, the order in which these steps are presented in the various routines and processes should not be construed as the only order in which the steps may be carried out. In some instances, some of these steps may be omitted. Those skilled in the art will recognize that the logical presentation of steps is sufficiently instructive to carry out aspects of the claimed subject matter irrespective of any particular language in which the logical instructions/steps are embodied.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 5 below. Additionally, in various embodiments all or some of the various routines may also be embodied in executable hardware modules including, but not limited to, system on chips, specially designed processors and or logic circuits, and the like on a computer system.

These routines/processes are typically embodied within executable code modules comprising routines, functions, looping structures, selectors such as if-then and if-then-else statements, assignments, arithmetic computations, and the like. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed, applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may deliver the computer-executable instructions (and data) to a computing device for execution via various transmission means and mediums including carrier waves and/or propagated signals, for purposes of this disclosure computer readable media expressly excludes carrier waves and/or propagated signals (i.e., the transmission means of the executable instructions per se.)

Figure 5:
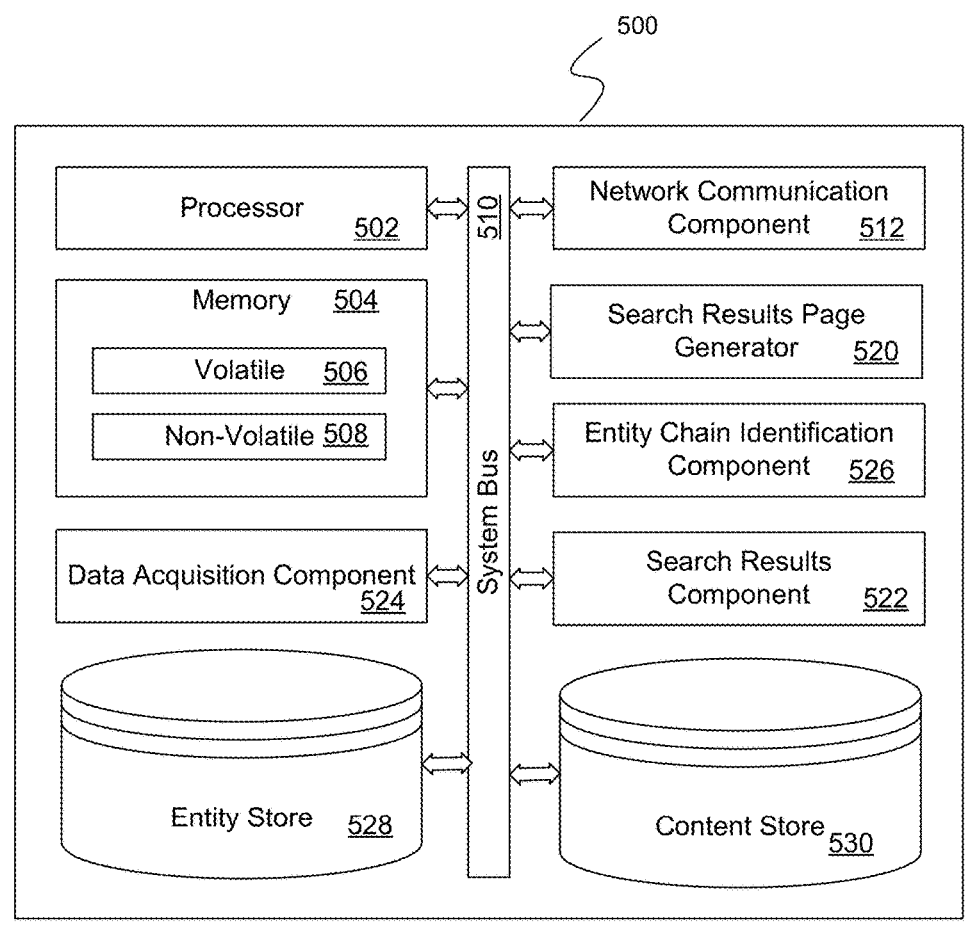
FIG. 5 is a block diagram illustrating exemplary components of a search engine configured according to aspects of the disclosed subject matter.

Turning to FIG. 5, FIG. 5 is a block diagram illustrating exemplary components of a search engine configured according to aspects of the disclosed subject matter. The exemplary search engine 500 includes one or more processors (or processing units), such as processor 502, and a memory 504. The processor 502 and memory 504, as well as other components, are interconnected by way of a system bus 510. The memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory 506 whereas ROM, solid-state memory devices, memory storage devices, and/or memory cards are examples of non-volatile memory 508.

Further still, the illustrated search engine 500 includes a network communication component 512 for interconnecting this computing device with other devices over a computer network, including user computing devices and entity websites. The network communication component 512, sometimes referred to as a network interface card or NIC, communicates over a network using one or more communication protocols via a physical (e.g., wired, optical, etc.) connection, a wireless connection, or both. As will be readily appreciated by those skilled in the art, a network communication component, such as network communication component 512, is typically comprised of hardware and/or firmware components (and may also include or comprise software components) that transmit and receive digital and/or analog signals over a transmission medium (i.e., the network.)

The processor 502 executes instructions retrieved from the memory 504 (and/or from computer-readable media) in carrying out various functions, particularly in regard to responding to a location-activity search query, as discussed and described above. The processor 502 may be comprised of any of a number of available processors such as single-processor, multi-processor, single-core units, and multi-core units. While a typical search engine (or other service configured to respond to location-activity search queries) is typically implemented on or across multiple computers or servers operating as a service on a network, elements of the disclosed subject matter maybe implemented on devices such as laptop computers, desktop computers, mini- and mainframe computers, and the like.

The exemplary search engine 500 also includes a data acquisition component 524. As suggested above in regard to FIG. 1 the search engine 500 obtains information regarding businesses via a crawling process, and also from other online services, such as Yelp®, Angie's List®, Open Table®, the Better Business Bureau®, local and state governments, and the like via the data acquisition component 524.

The search results component 522 identifies/obtains search results from the content store 520 as well as the entity store 528 in response to the search engine 500 receiving a search query from a computer user over the network. As will be readily recognized by those skilled in the art, retrieving relevant search results, other than from an entity store, is a process that is practiced in the art. According to aspects of the disclosed subject matter, contextual information regarding the requesting user may be relied upon to determine relevant search results, the contextual information including the computer user's specific geographic location, search and query popularity of venues (such as businesses, parks, etc.), user reviews of the various venues, and the like. Additionally, when a specific computer user's intent to obtain information regarding a geographic entity (i.e., a local search) is identified, this condition may be used to obtain relevant search results from the entity store. Similarly, knowing that the search query is a local search query, information regarding specific chain information may be used to filter results that might otherwise be considered relevant to the search query. The search results page generator 520 is configured to generate one or more search results pages that include search results relevant to a received search query. The search results page generator 520 may be configured to further include information regarding a geographic entity and/or entity chain according to information retrieved from the entity store 528. As indicated above, by using the identified entity chain information, search results relevant to the search query may be ranked and/or filtered according to the chain information, or the specific geographic entity of the entity chain. In addition to identifying those search results that more fully relate to the specific geographic entity and its entity chain, the search results page generator 520 may be further configured to generate a search results page to include or surface specific information corresponding to the specific geographic entity. For example and by way of illustration, when the geographic entity corresponds to a particular business location of a business chain, information such as a chain logo, corporate information, toll free phone numbers of the chain as well as of the particular business, a web site of the business, and the like may be included in the generated search results page.

The entity chain identification component 526 is configured to identify entity chains from geographic entity information sources and store the identified entity chain in the data stores. As described above in regard to routines 100-300, the entity chain identification component 526 determines whether two or more geographic entities belong to an entity chain.

Regarding the entity store 528 and the content store 530, each of these data stores corresponds to a collection of data that is organized so that its contents can easily be accessed, managed, and updated. Typically, but not exclusively, these data stores may be viewed as databases. Moreover, these data stores may be indexed data stores such that they are organized and structured to improve the speed of data retrieval operations, typically at the cost of additional writes and storage space to maintain the index data structure. Data stores, such as the entity store and the content store, are typically hosted on one or more persistent storage devices, such as hard drives, optical drives, solid-state storage devices, and the like. While the physical storage devices are illustrated as being local to the search engine 500, this is illustrative. According to various embodiments, the physical devices hosting the entity and content stores may be local or hosted remotely, including via a so-called cloud storage service.

While the entity store 528 and the content store 530 are illustrated as being separate data stores, and have been above-described as being separate data stores, in fact this is simply one embodiment of the disclosed subject matter. In alternative embodiments, the information stored in the entity store may be encompassed within the content store of the search engine 500. Accordingly, that the entity store 528 and the content store 530 are illustrated as separate components should be viewed as illustrative, but not limiting, of the disclosed subject matter.

Figure 6:
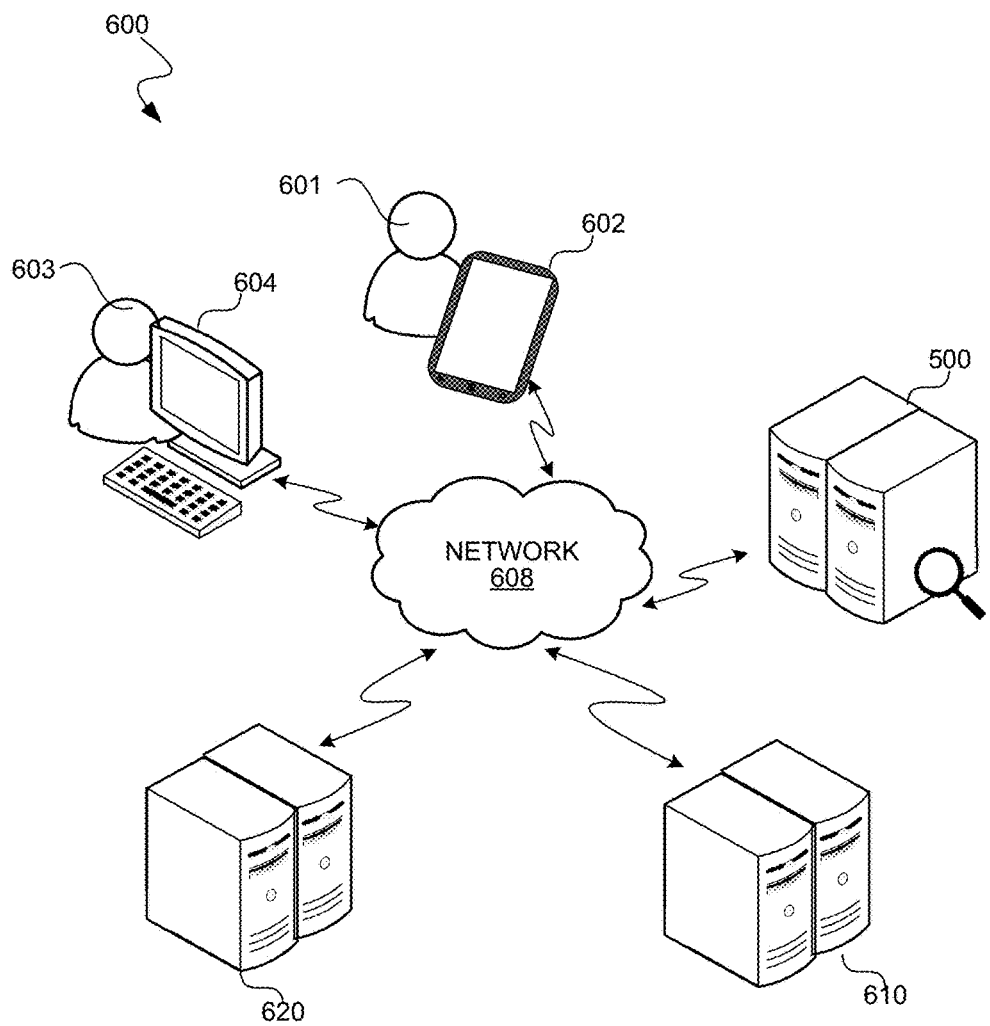
FIG. 6 is a pictorial diagram illustrating an exemplary network environment suitable for implementing aspects of the disclosed subject matter

Turning now to FIG. 6, FIG. 6 is a pictorial diagram illustrating an exemplary network environment 600 suitable for implementing aspects of the disclosed subject matter. The exemplary network environment 600 includes one or more user computers or computing devices, such as computing devices 602 and 604, through which persons/computer users 601 and 603 can submit search queries (including location-activity search queries) to a search engine 500 over a network 608, and receive responses from the search engine. Of course, the network environment 600 further includes other network sites, such as geographic entity sites (such as business site 620), social networking sites, such as social networking site 610) from which the search engine can obtain additional entity related information (as described above), and the like.

While the above description of the disclosed subject matter is presented in the context of a search engine that generates and maintains an entity store, including information regarding entity chains, it should be appreciated that many of the described processes may be implemented by a service other than a search engine. Indeed, an online service may be provided that obtains entity information regarding a plurality of geographic entities, and can further generate entity chain information regarding the plurality of geographic entities, as described herein.

While various novel aspects of the disclosed subject matter have been described, it should be appreciated that these aspects are exemplary and should not be construed as limiting upon the disclosed subject matter. Variations and alterations to the various aspects may be made without departing from the scope of the disclosed subject matter.

What is claimed:

1. A computer implemented method for generating entity chain information, the method comprising each of the following as implemented on a computing device including at least a processor, a memory, and a data store:
    obtaining entity information regarding a plurality of geographic entities; storing the obtained entity information of the plurality of geographic entities in an entity record corresponding to the geographic entity in a data store;
    analyzing the entity information of the plurality of geographic entities to generate one or more groups of geographic entities wherein the analysis identifies data corresponding to the plurality of geographic entities and establishes one or more groups of geographic entities;
    validating the generated one or more groups of geographic entities by determining a similarity score for the geographic entities of a generated group of geographic entities, the similarity score corresponding to the similarity of a geographic entity to the generated group of geographic entities to which it is grouped;
    for each geographic entity of a group of geographic entities,
        removing a geographic entity from the group of geographic entities where the similarity score for the geographic entity falls below a predetermined threshold of similarity for retaining the geographic entity in a predetermined group of geographic entities; and
    identifying an entity chain for each generated group having at least two of the plurality of geographic entities remaining in a respective one of the plurality of geographic entities.

2. The computer implemented method of claim 1, wherein generating one or more groups of geographic entities wherein the analysis identifies data corresponding to the plurality of geographic entities and establishes one or more groups of geographic entities comprises:
    determining a grouping similarity score between a first and a second geographic entity;
    determining the grouping similarity score between the first and the second geographic entity exceeds a predetermined threshold of similarity for grouping geographic entities into a group; and
    including the first geographic entity in a group of geographic entities with the second geographic entity.

3. The computer implemented method of claim 2, wherein determining the grouping similarity score between the first and the second geographic entities comprises:
    accessing a plurality of entity attributes corresponding to the first and the second geographic entities from the data store; and
    determining the grouping similarity score between the first and the second geographic entities according to the plurality of entity attributes.

4. The computer implemented method of claim 3, wherein the plurality of entity attributes includes any one or more of an entity name, an entity phone number, an entity category, an entity web site, and descriptive n-grams based on the keywords used in the entity's web sites of the first and second geographic entities.

5. The computer implemented method of claim 1 further comprising:
    determining dominant entity attributes of the generated group of geographic entities; and
    wherein determining a similarity score for the geographic entities of a generated group of geographic entities comprises determining similarity score for the geographic entities of a generated group of geographic entities with regard to the dominant entity attributes of the generated group of geographic entities.

6. The computer implemented method of claim 5, wherein the dominant entity attributes of the generated group of geographic entities comprise any one or more of the following: a dominant entity name, a dominant phone number, and a dominant entity category.

7. The computer implemented method of claim 6, wherein the dominant entity attributes of the generated group of geographic entities further comprises a plurality of dominant entity names, a plurality of dominant phone numbers, or a plurality of dominant entity categories.

8. The computer implemented method of claim 7, wherein the similarity score is an aggregate similarity score, the aggregate similarity score being generated according at least two of the dominant entity attributes of the generated group of geographic entities.

9. The computer implemented method of claim 8, wherein identifying an entity chain for each generated group having at least two of the plurality of geographic entities comprises identifying an entity chain for each generated group having at least two of the plurality of geographic entities upon determining that the generated group having at least two of the plurality of geographic entities includes at least two geographic entities.

10. The computer implemented method of claim 1, wherein identifying an entity chain for the generated group of geographic entities further comprises, for the at least two geographic entities, indicating in an entity record corresponding to a geographic entity in the data store that the geographic entity belongs to the entity chain.

11. A computer implemented method of a search engine for responding to a search query from a computer user, the method comprising each of the following as implemented on a computing device upon which the search engine operates, including at least a processor, and a memory:
 providing an entity store, the entity store storing information regarding a plurality of geographic entities, and further comprising information regarding a plurality of entity chains, each entity chain comprising at least two geographic entities;
 receiving a search query from a computer user, the search query identifying a query intent for which relevant search results are requested;
 determining a set of search results relevant to the query intent of the search query from a content store of the search engine, the set of search results being an ordered set of search results;
 determining whether the query intent of the search query is directed to a geographic entity, and upon determining that the query intent of the search query is directed to a geographic entity:
  determining whether the geographic entity is part of an entity chain according to information from the entity store, and upon determining that the geographic entity is part of an entity chain:
   obtaining information regarding the entity chain of which the geographic entity is a part; and
   reordering the set of search results according to the obtained information regarding the entity chain;
  generating a search results page according to the reordered set of search results; and
  returning the generated search results page in response to the search query.

12. The computer implemented method of claim 11, wherein providing an entity store comprises:
 obtaining entity information regarding a plurality of geographic entities;
 storing the identified entity data of the plurality of geographic entities in an entity record corresponding to the geographic entity in the entity store;
 analyzing the entity information of the entity records of the plurality of geographic entities to generate one or more groups of geographic entities wherein the analysis identifies data corresponding of the plurality of geographic entities and establishes one or more groups of geographic entities;
 validating the generated one or more groups of geographic entities by
  determining a similarity score for each of the geographic entities of a generated group of geographic entities, the similarity score corresponding to the similarity of a geographic entity the generated group of geographic entities to which it is grouped;
  for each geographic entity of a group of geographic entities,
   removing a geographic entity from the group of geographic entities where the similarity score for the geographic entity falls below a predetermined threshold of similarity for retaining the geographic entity in the predetermined group of geographic entities; and
  identifying an entity chain for each generated group having at least two of the plurality of geographic entities remaining in a respective one of the plurality of geographic entities.

13. The computer implemented method of claim 12, wherein generating one or more groups of entity entities from the plurality of entity records corresponding to geographic entities in the entity store comprises:
 determining a grouping similarity score between a first and a second geographic entity;
 determining the grouping similarity score between the first and the second geographic entity exceeds a predetermined threshold of similarity for grouping geographic entities into a group; and
 including the first geographic entity in a group of geographic entities with the second geographic entity.

14. The computer implemented method of claim 13, wherein determining the grouping similarity score between the first and the second geographic entities comprises:
 accessing a plurality of entity attributes corresponding to each of the first and the second geographic entities from the entity store; and
 determining the grouping similarity score between the first and the second geographic entities according to the plurality of entity attributes.

15. The computer implemented method of claim 14 further comprising:
 determining dominant entity attributes of the generated group of geographic entities; and
 wherein determining a retaining similarity score for the geographic entities of a generated group of geographic entities comprises determining retaining similarity score for the geographic entities of a generated group of geographic entities with regard to the dominant entity attributes of the generated group of geographic entities.

16. The computer implemented method of claim 15, wherein establishing an entity chain in the entity store for the generated group of geographic entities comprises establishing an entity chain in the entity store for the generated group of geographic entities upon determining that the generated group of geographic entities includes at least two geographic entities.

17. The computer implemented method of claim 16, wherein establishing an entity chain in the entity store for the generated group of geographic entities further comprises, for the at least two geographic entities, indicating in an entity record corresponding to a geographic entity in the entity store that the geographic entity belongs to the entity chain.

18. A computer system hosting a search engine for responding to a search query, the system comprising a processor and a memory, wherein the processor executes instructions stored in the memory as part of or in conjunction with additional components to respond to a search query, the additional components comprising:
 a data acquisition component, wherein the data acquisition component obtains entity information regarding a plurality of geographic entities and stores the entity information for the plurality of geographic entities in an entity store as entity records;
 an entity chain identification component, wherein the entity chain identification component identifies and stores entity chain information in the entity store;
 a search results component, wherein the search results component is configured to obtain search results from a content store and the entity store when the query topic of the search query is directed to a geographic entity; and a search results page generator, wherein the search results page generator generates a search results page according to the search results obtained from the search results component in response to the search engine receiving a search query.

19. The computer system of claim 18, wherein in identifying entity chain information and storing the identified entity chain information in the entity store, the entity chain identification component is configured to:

generate one or more groups of geographic entities from the plurality of entity records corresponding to the plurality of geographic entities; and validating the generated one or more groups of geographic entities by:

determining a similarity score for the geographic entities of a generated group of geographic entities, the similarity score corresponding to the similarity of a geographic entity the generated group of geographic entities to which it is grouped;

for each geographic entity of a group of geographic entities, removing a geographic entity from the group of geographic entities where the similarity score for the geographic entity falls below a predetermined threshold of similarity for retaining the geographic entity in the predetermined group of geographic entities; and identifying an entity chain for each generated group having at least two of the plurality of geographic entities remaining in a respective one of the plurality of geographic entities.

20. The computer system of claim 18, wherein in generating one or more groups of geographic entities from the plurality of entity records corresponding to the plurality of geographic entities in the entity store the entity chain identification component is further configured to:

determine a grouping similarity score between a first and a second geographic entity;

determine the grouping similarity score between the first and the second geographic entity exceeds a predetermined threshold of similarity for grouping geographic entities into a group; and include the first geographic entity in a group of geographic entities with the second geographic entity.

* * * * *